(12) United States Patent
Meyer et al.

(10) Patent No.: US 8,589,165 B1
(45) Date of Patent: *Nov. 19, 2013

(54) FREE TEXT MATCHING SYSTEM AND METHOD

(75) Inventors: Gregory Brian Meyer, San Antonio, TX (US); James Elden Nicholson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,542

(22) Filed: Jan. 24, 2012

Related U.S. Application Data

(63) Continuation of application No. 11/858,222, filed on Sep. 20, 2007, now Pat. No. 8,103,506.

(51) Int. Cl.
*G10L 13/08* (2013.01)

(52) U.S. Cl.
USPC ............ 704/260; 704/1; 704/2; 704/3; 704/4; 704/5; 704/6; 704/7; 704/8; 704/9; 704/10; 704/270; 704/272; 704/237; 704/256; 715/256

(58) Field of Classification Search
USPC ......................................................... 704/260
See application file for complete search history.

(56) References Cited

U.S. PATENT DOCUMENTS

| | | | |
|---|---|---|---|
| 4,833,610 A | | 5/1989 | Zamora et al. |
| 5,751,907 A | * | 5/1998 | Moebius et al. ............. 704/267 |
| 6,049,594 A | | 4/2000 | Furman et al. |
| 6,272,456 B1 | * | 8/2001 | de Campos ....................... 704/8 |
| 6,873,993 B2 | * | 3/2005 | Charlesworth et al. ....... 707/740 |
| 7,089,188 B2 | | 8/2006 | Logan et al. |
| 7,092,870 B1 | * | 8/2006 | Chen et al. ........................ 704/9 |
| 7,366,984 B2 | | 4/2008 | Robbins et al. |
| 7,467,087 B1 | * | 12/2008 | Gillick et al. ................. 704/260 |

(Continued)

OTHER PUBLICATIONS

A. Jansen, et al., "A Probabilistic Speech Recognition Framework Based on the Temporal Dynamics of Distinctive Feature Landmark Detectors," University of Chicago, [online]. Retrieved from the Internet on Sep. 20, 2007 using <URL: http://people.cs.uchicago.edu/~niyogi/papersps/lsrpaper.pdf> 50 pages.

(Continued)

*Primary Examiner* — Pierre-Louis Desir
*Assistant Examiner* — Fariba Sirjani
(74) *Attorney, Agent, or Firm* — Brooks, Cameron & Huebsch, PLLC

(57) ABSTRACT

The present disclosure provides method and system for converting a free text expression of an identity to a phonetic equivalent code. The conversion follows a set of rules based on phonetic groupings and compresses the expression to a shorter series of characters than the expression. The phonetic equivalent code may be compared to one or more other phonetic equivalent code to establish a correlation between the codes. The phonetic equivalent code of the free text expression may be associated with the code of a known identity. The known identity may be provided to a user for confirmation of the identity. Further, a plurality of expressions stored in a database may be consolidated by converting the expressions to phonetic equivalent codes, comparing the codes to find correlations, and if appropriate reducing the number of expressions or mapping the expressions to a fewer number of expressions.

20 Claims, 5 Drawing Sheets

(56) References Cited

U.S. PATENT DOCUMENTS

| | | | |
|---|---|---|---|
| 7,555,534 B2* | 6/2009 | Ramanathan et al. | 709/217 |
| 7,689,408 B2* | 3/2010 | Chen et al. | 704/8 |
| 7,787,907 B2* | 8/2010 | Zeinstra et al. | 455/563 |
| 7,912,718 B1* | 3/2011 | Conkie et al. | 704/258 |
| 7,945,441 B2* | 5/2011 | Thompson et al. | 704/222 |
| 7,958,129 B2* | 6/2011 | Surakka et al. | 707/749 |
| 7,962,486 B2* | 6/2011 | Adair et al. | 707/737 |
| 7,983,915 B2* | 7/2011 | Knight et al. | 704/254 |
| 8,103,506 B1* | 1/2012 | Meyer et al. | 704/260 |
| 8,117,026 B2* | 2/2012 | Lee et al. | 704/10 |
| 8,386,237 B2* | 2/2013 | Davtchev et al. | 704/8 |
| 2003/0191626 A1* | 10/2003 | Al-Onaizan et al. | 704/8 |
| 2003/0212563 A1* | 11/2003 | Ju et al. | 704/277 |
| 2003/0229494 A1* | 12/2003 | Rutten et al. | 704/254 |
| 2004/0024760 A1 | 2/2004 | Toner et al. | |
| 2004/0260681 A1* | 12/2004 | Dvorak | 707/3 |
| 2005/0119875 A1* | 6/2005 | Shaefer et al. | 704/7 |
| 2005/0182616 A1* | 8/2005 | Kotipalli | 704/2 |
| 2005/0182629 A1* | 8/2005 | Coorman et al. | 704/266 |
| 2005/0234722 A1* | 10/2005 | Robinson et al. | 704/257 |
| 2006/0206324 A1* | 9/2006 | Skilling et al. | 704/231 |
| 2007/0011132 A1* | 1/2007 | Zhou et al. | 707/1 |
| 2007/0061067 A1* | 3/2007 | Zeinstra et al. | 701/200 |
| 2007/0156404 A1 | 7/2007 | Lee et al. | |
| 2007/0162281 A1* | 7/2007 | Saitoh et al. | 704/251 |
| 2007/0189613 A1* | 8/2007 | Tanaka | 382/229 |
| 2007/0213983 A1* | 9/2007 | Ramsey | 704/254 |
| 2007/0234397 A1* | 10/2007 | Pearson et al. | 725/137 |
| 2008/0270138 A1* | 10/2008 | Knight et al. | 704/260 |
| 2008/0275700 A1* | 11/2008 | Bingley et al. | 704/235 |
| 2009/0011799 A1* | 1/2009 | Douthitt et al. | 455/569.1 |
| 2009/0043575 A1* | 2/2009 | Thompson et al. | 704/230 |
| 2009/0076821 A1* | 3/2009 | Brenner et al. | 704/260 |
| 2009/0083037 A1* | 3/2009 | Gleason et al. | 704/260 |
| 2009/0204404 A1* | 8/2009 | Jarman et al. | 704/260 |
| 2012/0253816 A1* | 10/2012 | Niemeyer et al. | 704/260 |

OTHER PUBLICATIONS

"Voiced uvular fricative," [online], Retrieved from the Internet on Sep. 20, 2007 using <URL: http://en.wikipedia.org/wiki/voiced_uvular_fricative> 3 pages.

"Phoneme," [online], Retrieved from the Internet on Sep. 20, 2007 using <URL: http:en.wikipedia.org/wiki/Phoneme> 6 pages.

"What is a phonetically similar segment?," SIL International [online], Retrieved from the Internet on Sep. 20, 2007 using <URL: http://www.sil.org/lingusitics/GlossaryOfLinguisticTerms/WhatIsAPhoneticallySimiliarSegm.htm> 1 page.

White, Simon, "Tame the Beast by Matching Similar Strings," [online] Retrieved from the Internet on Sep. 20, 2007 using <URL: http://www.sil.org/linguisticTerms/WhatIsAPhoneticallySimiliarSegm.htm> 5 pages.

"Allophone," [online], Retrieved from the Internet on Sep. 20, 2007 using <URL: http://en.wikipedia.org/wiki/Allophone> 2 pages.

Ulrich Pfiefer, Thomas Poersch and Norbert Fuhr, "Retrieval Effectiveness of Proper Name Search Methods," Information Processing & Management, vol. 32, No. 6, pp. 667-679, 1996.

* cited by examiner

FREE TEXT MATCHING SYSTEM AND METHOD

CROSS-REFERENCE TO RELATED APPLICATIONS

The present patent application is a continuation of U.S. patent application Ser. No. 11/858,222, filed Sep. 20, 2007, and is related in subject matter in the following commonly assigned application Ser. Nos. 11/858,225, filed Sep. 20, 2007; and 11/858,231, filed Sep. 20, 2007.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Field

The disclosure relates to computerized systems, and, more specifically, to systems and methods for correlating free text.

2. Description of Related Art

Customers typically provide variations while entering data for a given desired input into computerized forms. The variations often occur while entering data in free text fields where the customer has the option to speak, type, or otherwise indicate an entry without preselections being offered to the client as the proper response. Otherwise, preselections may be offered in customary lists and other compilations, such as "drop-down menu" input selections. The free text fields are especially helpful when the preselections to the customer may be quite large. For example, entering the name of a financial institution into a new credit card application may create an enormous drop-down menu of the tens of thousands of possible financial institutions in the United States. While the free text fields offer flexibility to a customer, the variations in possible entries for a known financial institution or other identity that the customer intends to enter into the free text field presently creates challenges in computer software in correlating the free text entry to a known identity. Electronic data systems currently have difficulty at times correlating the free text entry with the known identity due to variations in spellings, different first words, abbreviations instead of the full words and vice versa, and other differences between the free text entry and the known identity.

From the customer perspective, the result is sometimes a frustrating experience in online entries by the inability or slowness of the computerized data entry process to correlate what the customer considers to be a correct entry with the known identity. From a computer programmer perspective, the result is loss of productive hours for a department in managing large databases of even small variations in free text entries that are periodically updated and sometimes manually correlated to an appropriate known identity.

Outside the context of computerized correlation with its more exacting requirements than manual entries, the U.S. Government in the 1930's developed an algorithm for manually transcribing Census Bureau records of last names into compressed terms and indexing the terms for review. The algorithm appears to have included the following steps: (i) capitalizing all letters in the word, dropping all punctuation marks, and padding the word with rightmost blanks as needed during each procedure step; (ii) retaining the first letter of the word; (iii) changing all occurrences of the following letters to zero: A, E, I, 0, U, H, W, and Y; (iv) changing letters from the following sets into the digit given to the set:

1=B, F, P, V
2=C, J, K, Q, s, X, Z
3=D, T
4=L
5=M,N
6=R

The steps then included (v) removing all pairs of digits which occur beside each other from the string that resulted after the changing of the letters to the digits; (vi) removing all zeros from the string remaining from step (v) that were placed in the string from step (iii); and (vii) padding the string with trailing zeros and return only the first four positions, which have the form of an upper case latter followed by three digits.

In the 1950's, some adjustments were made to this procedure to replace various other consonant sounds with letters that may be referenced to the sets above and changed into the appropriate digit, as follows:

DG with G
GH with H
GN with N
KN with N
PH with F
MP with M when it is followed by S, Z, or T
PS with S when it starts a word
PF with F when it starts a word
MB with M
TCH with CH
A or I with E when it starts a word and is followed by a vowel from the list of A, E, I, 0

However, the algorithm apparently did not gain widespread favor. Apparently, the steps were not utilized for broad coding requirements in computer-based systems. Further, the steps lacked the ability to realistically correlate a free text entry of an identity to a known identity to a user, database, or other system.

Thus, there remains a need to provide a method and system for customers to enter free text data that may be correlated to a known identity using computer-based systems.

SUMMARY

The present disclosure provides a method and system for converting a free text expression of an identity to a phonetic equivalent code. The conversion follows a set of rules based on phonetic groupings and compresses the expression to a shorter series of characters than the expression. The phonetic equivalent code may be compared to one or more other phonetic equivalent codes to establish a correlation between the codes. The phonetic equivalent code of the free text expression may be associated with the code of a known identity. The known identity may be provided to a user for confirmation of the identity. Further, a plurality of expressions stored in a database may be consolidated by converting the expressions to phonetic equivalent codes, comparing the codes to find correlations, and if appropriate, reducing the number of expressions or mapping the expressions to a fewer number of expressions.

The disclosure provides a system for correlating a free text expression of an identity to at least one known identity that has been converted to a first phonetic equivalent code, comprising: at least one subsystem configured to allow an input of an expression for an input identity; at least one subsystem configured to electronically convert the expression for the input identity to a second phonetic equivalent code; at least one subsystem configured to compare the second phonetic equivalent code of the input identity with the first phonetic equivalent code of the known identity to determine a correlation between the second phonetic equivalent code and the first phonetic equivalent code; and at least one subsystem configured to electronically provide the known identity using the correlation between the second phonetic equivalent code and the first phonetic equivalent code.

The disclosure also provides a method for correlating a free text expression of an identity to at least one known identity that has been converted to a first phonetic equivalent code, comprising: allowing an input of an expression for an input identity; electronically converting the expression for the input identity to a second phonetic equivalent code; comparing the second phonetic equivalent code of the input identity with the first phonetic equivalent code of the known identity to determine a correlation between the second phonetic equivalent code and the first phonetic equivalent code; and electronically providing the known identity using the correlation between the second phonetic equivalent code and the first phonetic equivalent code.

The disclosure further provides a computer-readable medium comprising computer-readable instructions for correlating a free text expression of an identity to at least one known identity that has been converted to a first phonetic equivalent code, said computer-readable instructions comprising instructions that: allow an input of an expression for an input identity; electronically convert the expression for the input identity to a second phonetic equivalent code; compare the second phonetic equivalent code of the input identity with the first phonetic equivalent code of the known identity to determine a correlation between the second phonetic equivalent code and the first phonetic equivalent code; and electronically provide the known identity using the correlation between the second phonetic equivalent code and the first phonetic equivalent code.

The disclosure provides a system for correlating at least one identity having multiple expressions in a database, comprising: at least one subsystem configured to electronically convert a plurality of expressions of at least one identity to phonetic equivalent codes; at least one subsystem configured to compare the phonetic equivalent codes to determine correlations between the codes; and at least one subsystem configured to correlate at least one of the plurality of expressions with a selected identity based on the phonetic equivalent code for the at least one expression having a threshold correlation to a phonetic equivalent code for the selected identity.

The disclosure also provides a method for correlating at least one identity having multiple expressions in a database, comprising: electronically converting a plurality of expressions of at least one identity to phonetic equivalent codes; comparing the phonetic equivalent codes to determine correlations between the codes; and correlating at least one of the plurality of expressions with a selected identity based on the phonetic equivalent code for the at least one expression having a threshold correlation to a phonetic equivalent code for the selected identity.

The disclosure further provides a computer-readable medium comprising computer-readable instructions for correlating at least one identity having multiple expressions in a database, said computer-readable instructions comprising instructions that: electronically convert a plurality of expressions of at least one identity to phonetic equivalent codes; compare the phonetic equivalent codes to determine correlations between the codes; and correlate at least one of the plurality of expressions with a selected identity based on the phonetic equivalent code for the at least one expression having a threshold correlation to a phonetic equivalent code for the selected identity.

The disclosure provides a system for converting an expression of an identity to a phonetic equivalent code, comprising: at least one subsystem configured to establish a plurality of letter characterizations for an alphabet having a plurality of letters; at least one subsystem configured to assign a character to represent each of the letter characterizations; at least one subsystem configured to assign a plurality of the alphabet letters to the letter characterizations, each letter characterization having at least one letter; at least one subsystem configured to electronically convert an expression of an identity to a phonetic equivalent code using the characters of the letter characterizations; and at least one subsystem configured to provide the phonetic equivalent code to a user, a database, an electronic storage medium, or a combination thereof.

The disclosure also provides a method for converting an expression of an identity to a phonetic equivalent code, comprising: establishing a plurality of letter characterizations for an alphabet having a plurality of letters; assigning a character to represent each of the letter characterizations; assigning a plurality of the alphabet letters to the letter characterizations, each letter characterization having at least one letter; electronically converting an expression of an identity to a phonetic equivalent code using the characters of the letter characterizations; and providing the phonetic equivalent code to a user, a database, an electronic storage medium, or a combination thereof.

The disclosure further provides a computer-readable medium comprising computer-readable instructions for converting an expression of an identity to a phonetic equivalent code, said computer-readable instructions comprising instructions that: establish a plurality of letter characterizations for an alphabet having a plurality of letters; assign a character to represent each of the letter characterizations; assign a plurality of the alphabet letters to the letter characterizations, each letter characterization having at least one letter; electronically convert an expression of an identity to a phonetic equivalent code using the characters of the letter characterizations; and provide the phonetic equivalent code to a user, a database, an electronic storage medium, or a combination thereof.

BRIEF DESCRIPTION OF THE DRAWINGS

While the concepts provided herein are susceptible to various modifications and alternative forms, only a few specific embodiments have been shown by way of example in the drawings and are described in detail below. The figures and detailed descriptions of these specific embodiments are not intended to limit the breadth or scope of the concepts or the appended claims in any manner. Rather, the figures and detailed written descriptions are provided to illustrate the concepts to a person of ordinary skill in the art as required by 35 U.S.C. §112.

DETAILED DESCRIPTION

One or more illustrative embodiments of the concepts disclosed herein are presented below. For the sake of clarity, not all features of an actual implementation are described or shown in this application. It is understood that in the development of an actual embodiment, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Figure 1:
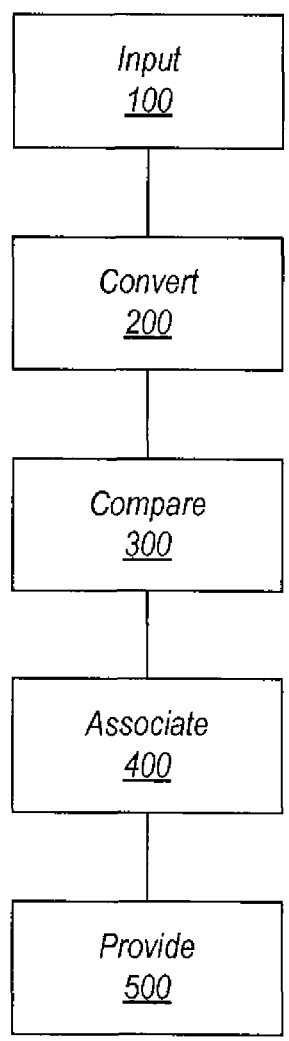
FIG. 1 is a schematic flowchart of an overall embodiment for free text matching.

FIG. 1 is a schematic flowchart of an overall embodiment for free text matching. In at least one embodiment, the free text matching method and system may begin by providing input of an identity to a free text field, as shown in Block 100. The input is generally intended to be an identity of a particular institution, individual, or other entity, personalized data, and other information that may be identified by a computer, and for efficiency of reference is termed an "identity" herein. The input of the identity will be termed herein an "expression." The expression may vary, for example, depending on the particular user and previously entered data into a database, or downloaded information from various databases having different expressions, and so forth, and thus may have multiple expressions of the same identity.

In Block 200, the input expression is converted to a phonetic equivalent code. The phonetic equivalent code conversion may vary and exemplary embodiments will be described herein. The conversion process is intended to reduce the variations of expression of the identity to a common code. Alternatively, the conversion process is intended to convert the expression of the input identity to a phonetic code that is equivalent to a previously entered identity with its converted code.

In Block 300, the phonetic equivalent code of the input identity may be compared with one or more other phonetic equivalent codes for various identities. Other phonetic equivalent codes may exist, for example, in a database identified with known identities. Further, other phonetic equivalent codes may exist for other expressions of the given identity and the codes mapped to the given entity, so that a correlation may be further obtained even between different codes for the same identity. In some embodiments, the comparison between the phonetic equivalent codes may be incrementally correlated through multiple passes of comparisons. For example, a first comparison may be made with a high level of specificity using numerous characters. If no appropriate correlations are made, then less restrictive comparisons may be incrementally made on subsequent passes until at least a threshold level of correlation is reached between the codes.

In Block 400, the phonetic equivalent code may be associated with one or more known identities. For example, the phonetic equivalent code for the input expression may be associated with a phonetic equivalent code of a known identity having such a threshold correlation. If multiples expressions exist in a database and the comparison is between the phonetic equivalent codes for such multiple expressions, the previous process of comparing the phonetic equivalent codes to determine correlations may result is a convergence to one or more identities having a threshold correlation. The known identity or a subset of identities having a threshold correlation may be thus identified. Further, if multiple expressions exist for a known identity, the quantity of expressions of the identity may be reduced based on the threshold correlation. For example, if two expressions exist in a database for the same identity, then one of the expressions may be eliminated from the database or other storage medium as redundant to the other expression after converting to phonetic equivalent codes and correlating the phonetic equivalent codes.

In Block 500, the resulting identity to which the phonetic equivalent code yielded a threshold correlation may be provided to some user, such as the user who entered the original expression for the input identity. The user may then verify that the associated identity to the phonetic equivalent code is in fact the desired identity that the user intended. In some cases, multiple identities may correlate to the phonetic equivalent code of the input identity from the user. In such cases, multiple identities may be provided to the user to select from a correlated list. Alternatively, the phonetic equivalent code may be provided to a database or other electronic storage medium for further processing.

Figure 2:
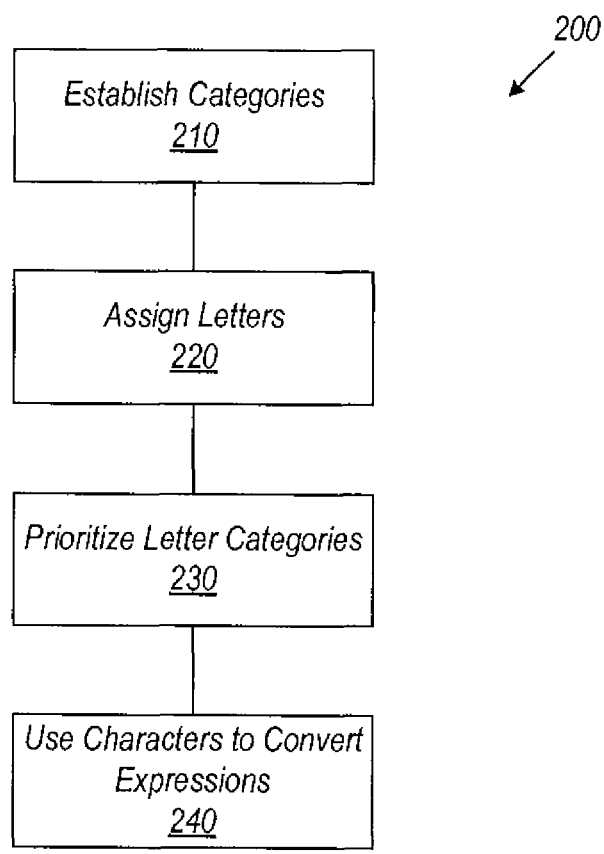
FIG. 2 is a schematic flowchart of a portion of the flowchart in FIG. 1, providing further details of converting to a phonetic equivalent code.

FIG. 2 is a schematic flowchart of a portion of the flowchart in FIG. 1, providing further details of converting to a phonetic equivalent code. The flowchart illustrates details of an exemplary embodiment of Block 200, described above.

In Block 210, categories are established. In at least one embodiment, the categories may include up to nine categories, so that each category will be restricted to a single digit character to represent a value for the category.

In Block 220, letters in a given language may be assigned according to the applicable category. The term "letters" is used broadly herein to include any symbols or characters used in a language to communicate in written form. For example and without limitation, the letters may be assigned to categories that are based upon phonetics for a given language. An embodiment of such categories will be described in more detail below.

In Block 230, the letter categories may be prioritized. For example, the categories may be prioritized by frequency of use. It is known that certain letters in any given alphabet are used more than other letters. Thus, prioritizing the categories may include selecting a most frequently used letter in each category and comparing the frequency of usage of that most frequently used letter in one category to the frequency of usage of a most frequently used letter in another category to establish the order of categories. The order of categories may be used to establish a priority in searching and comparing the phonetic equivalent codes after the expression of the identity has been converted, as described above. It is believed that by prioritizing the categories starting with the most frequently used letters and progressing to the least frequently used letters, the searching may be more quickly focused for ultimately comparing the phonetic equivalent codes. Such prioritizing may also assist in efficiently converting the expressions to phonetic equivalent codes.

In Block 240, the categories and characters representing the categories may be used to convert the expression to a phonetic equivalent code. A predefined set of rules may be used by a processor, such as with a computer-readable medium, in conjunction with the categories and characters of the categories to generate the phonetic equivalent code. An exemplary set of rules is described in more detail below.

Figure 3:
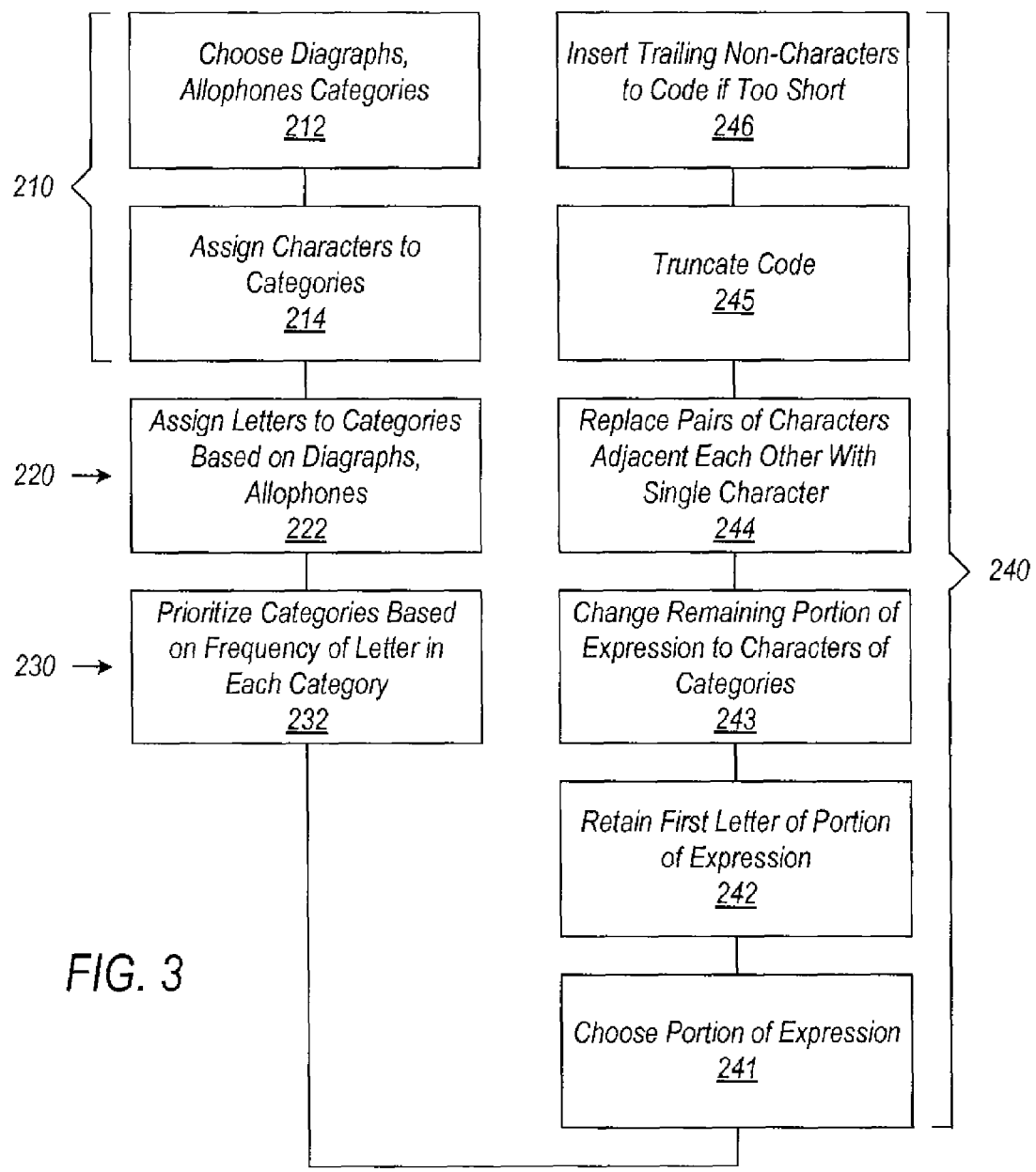
FIG. 3 is a schematic flowchart of an exemplary embodiment, providing further details of the schematic flowchart of FIG. 2.

FIG. 3 is a schematic flowchart of an exemplary embodiment, providing further details of FIG. 2. In Block 212, having more detail than Block 210 shown above in FIG. 2, the categories to be established may be chosen using digraphs and allophones. A digraph is a tier of letters representing a single speech sound, such as "ea" in "meat" or "th" in "path" in the English language. An allophone is any member of the class of speech sounds that, taken together, are believed to be a phoneme, as the "t" sounds of: toe, stove, tree, hat pin, cat call, cats, catnip, button, and city. A phoneme is a set of phonetically similar, but slightly different sounds of the language that are heard as a same or similar sound by a native speaker. For example and without limitation, the digraphs and allophones used in one embodiment may be a range of Slavic, German, Asian, Hispanic and/or English native language speaker pronunciations, using the 26 characters of the English language alphabet without the five vowels, A, E, I, 0, and U. The digraphs and allophones of the exemplary embodiment may further include various letter combinations that have similar sounds in the Slavic, German, Asian and/or Hispanic native language speaker's pronunciation of the combination. For example, various allophones may include categories known as liquid semi-valves, conjugate nasals, glottals, plosives, fricatives, and other categories. Some categories of letters may be formed as miscellaneous categories of remaining letters not particularly falling into a given allophone. Further, some categories may be actually subcategories where a greater number of letters in a particular allophone or digraph may be separated to provide more specificity and granularity in the coding of the expression. For example, two of the categories may be fricative-based categories.

In Block 214, a character may be assigned to each category. For example and without limitation, the categories may be nine categories, each being assigned a character of a single digit number. The single digit number is advantageously used to expand the number of categories to the maximum number of single digits of a base 10 numbering system. Such nine numerically-based categories provide a great deal of granularity to the number of categories (as opposed to five or six categories), and yet allows the single digit number to be used in the phonetic equivalent code for processing. Such a single-digit number per letter conversion allows the relatively short and compressed code that may be readily searched by an electronic processor, such as in a computer, for comparison to other phonetic equivalent codes.

In Block 222, having more detail from Block 220 in FIG. 2, the letters of the alphabet are assigned to the categories based on, for example, digraphs and allophones. Using the English language of 21 consonants (26 characters minus 5 vowels) and various two-letter digraphs of common dialects spoken in association therewith), an exemplary categorization with assigned numbers may be as follows:

1=D, T
2=M, N, MB, KN, GN
3=C, S, Z
4=J, G, HG, GH
5=L
6=Y, LL
7=W, B
8=B, F, T
9=K, Q

In the above example, the first category of "D" and "T" may be described as fricatives. The second category of "M" and "N," and in certain combinations with "G," may be described as consonants nasals. The digraphs of "MB", "KN", and "GN" in some languages may also be considered consonant nasals. A further category of "C", "S," "X," and "Z" may also be described as fricatives. For the fourth category, "G" and "H" may be described as glottals, while in their non-glottal pronunciation are closer to "J". In the fourth category, "DG" and "GH" may have a similar classification as "G" and "H" in certain dialects. The fifth category of "R" and "L" may be described as liquid semi-vowels and are commonly equivalent in Asian speech. The sixth category of "Y" and "LL" may be grouped, based on the Hispanic written representation of "LL" for the English pronunciation of the sound usually written as "Y". In the seventh category, "W" and "V" may not be pronounced the same way by the mouth, but are grouped in the same category due to Slavic and Germanic written representation of "W" for a "V" and the English spoken sound being the opposite. In the eighth category, "B," "F," and "T" may be described as plosives and form a convenient categorization. In the ninth category, "K" and "Q" may be described as hard palettes and are the remaining letters of the alphabet.

The above described example of categorization may be termed a "lossy" equivalent letter category. The term "lossy" for present purposes is intended to include language compression by the use of phoneme equivalents. Such lossy equivalent letter categorization may include establishing categories based on phoneme equivalent and placing one or more letters of a given alphabet into such categories. Thus, a variety of different categories may exist depending upon the particular language. The above example is representative only of categories used in the English language with variance in commonly spoken languages of ethnic groups, to the United States including Slavic, German, Asian and Hispanic. Naturally, other equivalents may be added to such categories or may replace such categories.

In Block 232, the categories may be prioritized based on a frequency of usage of the letter in each category. This optional prioritizing may assist in speed of searching for correlation of the phonetic equivalent codes. In at least one embodiment, the prioritizing may occur based upon a most frequently used letter in a given category compared to a most frequently used letter in another category to establish a most frequently used category, where the categories are sequentially ordered based on frequency of usage. For example, in category 1, "T" is the most frequently used letter compared to the other letter, "D," in category 1 for the English language. In category 2, "N" is the most frequently used letter compared to the other letters in that category. By comparing the frequency usage of the letter "T" in category 1 with the frequency of the usage of letter "N" in category 2, it is seen that "T" occurs more frequently than "N." Therefore, category 1 is appropriately nominated the first category, so that category 1 is assigned a higher priority than category 2.

In category 3, "s" is the most frequently used letter of that category. Comparing the usage frequency of the most frequently used letter of category 2 ("N") with the usage frequency of "s" in category 2 shows that "N" is used more frequently. Therefore, category 2 is appropriately nominated the second category, so that category 2 is assigned a higher priority than category 3, but less priority than category 1.

The remaining categories may be similarly organized in priorities by usage frequency. Conveniently, the above exemplary listing of categories has already been arranged in numerical order according to such priority. However, it is to be understood that other arrangements may be made and the illustrated numerical arrangement by decreasing usage frequency is only exemplary. The characterizations into lossy equivalents and then prioritizing into an order is referenced herein as "frequency-weighted lossy equivalent letter categories."

Information exists to assist in establishing such characterizations. The information may be applied in modified ways to suit particular purposes for given categorizations. Examples of such categorizations and information are found in the following sources that are incorporated herein by reference: http://umsis.miami.edu/~jthomas/index1.html; http://en.wikipedia.org/wikiIV oiced uvular_fricative; http://en.wikipedia.org/wikiIPhoneme; http://www.sil.org/linguistics/GlossaryOfLinguisticTerms/WhatIsAPhoneticallySimilarS egm.htm; and http://en.wikipedia.org/wikil Allophone.

In Block 240, described above in FIG. 2, the expressions of the identity are converted, using the assigned characters representing the categories established in Block 210. The following Blocks provide further details of an exemplary and non-limiting embodiment of such conversions.

In Block 241, a portion of the expression may be chosen, based on trial and error efforts to determine a level of granularity and specificity useful to the particular application to establish correlations between phonetic equivalent codes. Generally, expressions will consist of more than enough letters to establish a threshold correlation. Thus, for efficiency, less than the total expression may be chosen, converted to a code, and compared with other converted expressions to correlate the identity. For example, without limitation, the first 10 letters and spaces of the expression may be chosen based upon trial and error to satisfy the relevant coding needed to provide correlation between the different expressions. Punctuation, such as periods, commas, parentheses, and the like, may be deleted prior to choosing the first 10 letters and spaces. Factors affecting the level of granularity and therefore number of letters and spaces of the expression include the amount of time to code the expression and the amount of time to correlate the other expressions.

Alternatively, in choosing the portion of expression, the vowels may be deleted from the expression prior to choosing the portion of the expression, in keeping with the above-established categories of consonants. Further, the expression may be at least partially collapsed before choosing the portion of the expression by deleting spaces between words of the expressions.

Examples Will be Shown Below.

In Block 242, the first letter of the portion of the expression may be retained for a first character of the coded expression. While Block 242 is optional, it is believed that retaining the first letter adds an additional level of specificity and granularity to the coding without significantly affecting the speed of searching and processing. For example, if the expression starts with "First," the "F" may be retained as the first character of the code.

In Block 243, the remaining portion of the expression may be converted to characters of the above-established categories. Each of the remaining letters of the portion of the expression may be matched to the letters in the established categories to determine the character for that letter of the expression to generate a phonetic equivalent code. This matching of the letters to the categories would naturally ignore any blanks in the portion of the expression and any remaining punctuation in the expression.

In Block 244, the code may be further synthesized by replacing pairs of characters adjacent each other with a single character. For example, two numbers adjacent each other that are the same may be replaced as a single number.

In Block 245, the converted code may be truncated to a given number of characters. The number of characters to remain may depend on the degree of specificity of the correlation desired. A shorter code made yield more correlation among a variety of expressions, but with less specificity. A longer code may yield a higher degree of specificity, but with fewer correlations. Thus, the particular application may determine the level of truncation, if any. In at least one exemplary embodiment, the truncation may yield four characters to establish a four-bit field.

In Block 246, the code may be further adjusted by adding trailing zeros or other characters. The trailing characters may assist in establishing a minimum number of characters for the code after the above coding process is performed to establish a predetermined minimum field length for the code.

Once the expression is converted into a code, the code may be correlated to one or more other expressions that have been converted into their codes. The other codes may be stored in a database or other memory device. The expression may be based on a real time input from a user of an identity, when the expression may be coded and then compared to previously established codes of identities. As another example, preexisting expressions of one or more identities may be stored in a database and it is desirous to consolidate the database expressions. The expressions may be converted into the codes and compared for correlation to determine overlapping or duplicate expressions. The overlapping or duplicate identities may be eliminated in the database.

In searching and comparing the codes, it is generally believed that a more rapid degree of correlation may occur by comparing the full phonetic equivalent code of the input expression to the full phonetic equivalent code of the other expressions. However, if the correlation does not occur, a less restrictive pass or iteration through the codes to be compared may be next performed. The multiple passes may continue to obtain at least some predetermined level of correlation between the coded expression and other phonetic equivalent codes. For example, the search may begin with a full truncated code based on the 10-character portion of the expression, where the code has a minimum of four characters including the initial character, as described above in the exemplary embodiment. If there is found a correlation between the codes, then it is likely that such correlation at that level of specificity will be the intended identity and the results may be provided upon that basis. If no correlation is made to the full code, then a second pass may be made, using a portion of the code such as three characters, and so forth until a level of correlation is obtained and is suitable for the intended purposes.

Alternatively, a reverse searching technique of that described above may be used. A search may begin with less restrictive criteria and identify a group of phonetic equivalent codes, then gradually reduce the number of equivalencies by progressively increasing the specificity of each pass of the search until a predetermined threshold level correlation is reached, if possible.

For example, a first search might start with the first character of the code to identify a certain group having the first character, followed by a second pass using the second character of the code to establish a smaller subset and so forth, until a degree of correlation is reached that is satisfactory for the intended purpose.

By way of example and without any sponsorship of such exemplary institutions, the following examples are provided to illustrate at least one concept of creating phonetic equivalent codes. The following two examples will use the above exemplary coding procedure described in reference to Block 212 through Block 245.

For example, if a user wishes to enter into a free text field an entity known as US SunTrust Bank, the above described coding procedure would convert the SunTrust Bank into a phonetic equivalent code as follows:

US SunTrust Bank (input expression of an identity)
    US SunTrus (first 10 letters and spaces of the expression)
    U332153 (maintain first letter, vowels and spaces ignored, convert remaining letters to the character of the category, where the character is a single-digit number in the exemplary method)
    U32153 (replace pairs of characters adjacent each other with a single character, i.e., "33" become "3")
    U213 (truncate the code to a four-bit string of characters)

For illustrative purposes, another financial institution, such as a First National Bank, may be entered and converted to a phonetic equivalent code as follows:

First National Bank (input expression of an identity)
    First Nati (first 10 characters and spaces of the expression)
    F53121 (first letter of the expression maintained, vowels and spaces ignored, remaining consonants converted to the numbers of the previously established exemplary categories, no pairs)
    F531 (code truncated)

Figure 4:
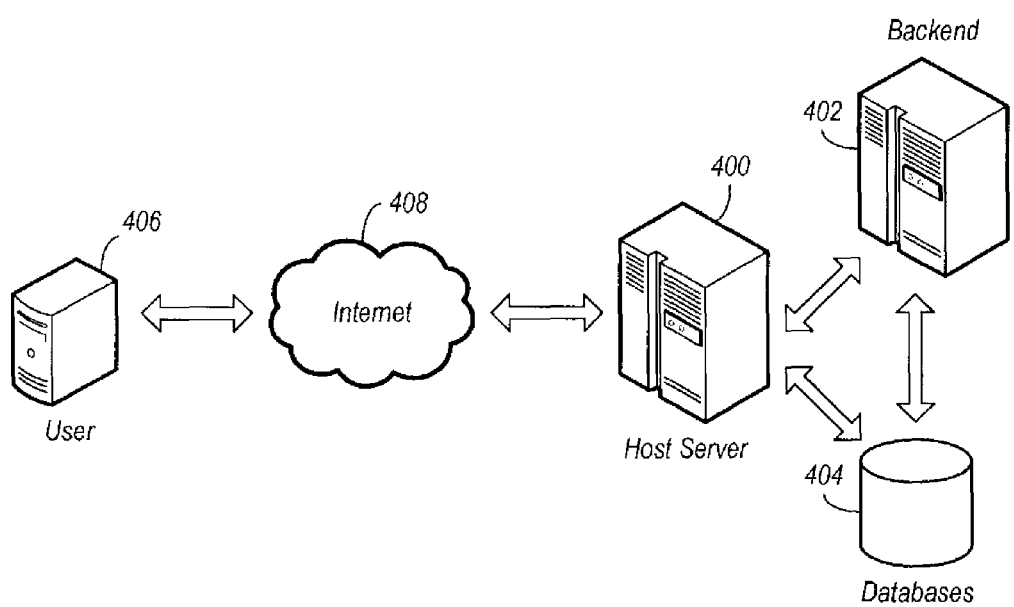
FIG. 4 is a schematic diagram of an exemplary infrastructure for converting the free text expressions to phonetic equivalent codes, comparing, and associating or otherwise correlating the expressions.

FIG. 4 is a schematic diagram of an exemplary infrastructure for converting the free text expressions to phonetic equivalent codes, comparing, associating or otherwise correlating the expressions, and other described functions herein. For economy of the description, these embodiments are discussed only with respect to one type of interface through a network, that is, an Internet site, namely World Wide Web sites, or Web sites. However, those having ordinary skill in the art will understand that the disclosed embodiments are equally applicable to other types of computer systems, from personal computers with local processors, to various types of remote interfaces between a user and a processor, including networks such as LANs, WANs, and other types of Internet sites, such as FTP (File Transfer Protocol) sites, Telnet sites, and the like.

The exemplary infrastructure includes at least one host server 400, a backend 402, and one or more databases 404, all interconnected as shown. Such an infrastructure is generally well known to those having ordinary skill in the art and may be found at numerous companies. Such companies may include, for example, banks, credit card companies, mortgage companies, investment companies, and other financial institutions, government agencies, educational institutions, and so forth.

Briefly, the host server 400 may operate as a host for any Internet site, such as a Web site, for any company. A user 406 using a computer running an Internet browser, such as a Web browser, may then type in an appropriate URL (Uniform Resource Locator) for the Web site. The computer causes the URL to be resolved into an IP address that may be used to connect the computer to the host server 400 over the Internet 408. The user 406 may then conduct one or more transactions with the company via the host server 400. Such transactions may include, for example, buying goods, obtaining services, paying bills, viewing account balances, transferring funds, changing investments, applying for financing, closing/opening accounts, and the like that may involve entering free text information. These transactions and other requests received by the host server 400 are passed to the company's backend 402 where they are processed by the company's business processes. The results of the backend processing are subsequently returned to the host server 400 for presentation to the user 406. Any data or information used by the backend 402 or the host server 400 may be retrieved from and stored in the databases 404.

In accordance with the disclosed embodiments, the user 406 may access the Web site of the company, and be asked to enter free text information as an expression at some time during the interaction. Alternatively, the user may provide such information to an operator or service person then enters the expression into the server, or the user or service person may speak the expression into a voice system to input the expression. Once the free text expression is entered, the expression is subsequently processed by converting the expression to a phonetic equivalent code. Depending on the embodiment, the phonetic equivalent code may be compared to existing phonetic equivalents codes in a database. If a correlation is found, the correlated results may be provided to the user, the service person, or other records and outputs. For example, if the user 406 is using the Web site, the results may be presented to the user for confirmation of the known identity or identities correlating to the free text expression by the phonetic equivalent codes.

Figure 5:
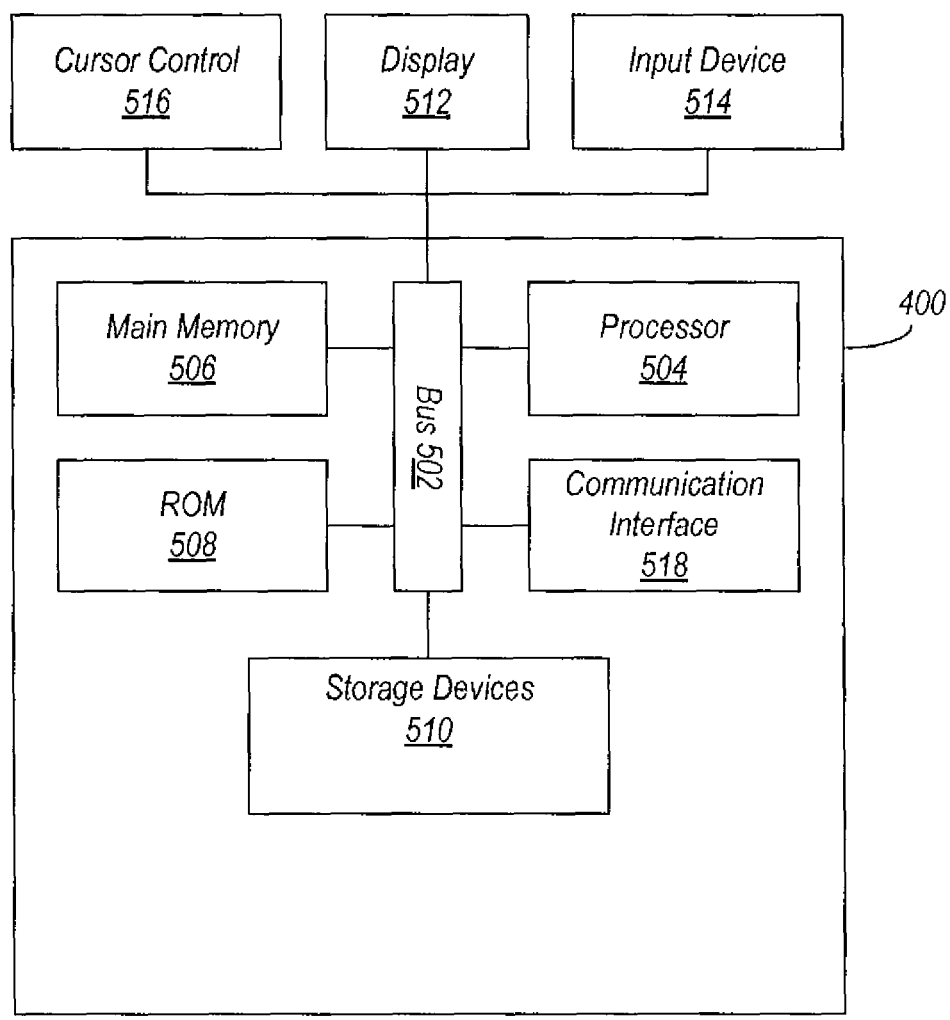
FIG. 5 illustrates the exemplary host server of FIG. 4 in more detail.

FIG. 5 illustrates the exemplary host server of FIG. 4 in more detail. Any suitable computer known to those having ordinary skill in the art may be used as the host server 400, including a personal computer, workstation, server, mainframe, and the like. Such a host server 400 typically includes a bus 502 or other communication mechanism for communicating information and a processor 504 coupled with the bus 502 for processing information. The host server 400 may also include a main memory 506, such as a random access memory (RAM) or other dynamic storage device, coupled to the bus 502 for storing computer-readable instructions to be executed by the processor 504. The main memory 506 may also be used for storing temporary variables or other intermediate information during execution of the instructions to be executed by the processor 504. The host server 400 may further include a read-only memory (ROM) 508 or other static storage device coupled to the bus 502 for storing static information and instructions for the processor 504. A computer-readable storage device 510, such as a magnetic, optical, or solid state device, may be coupled to the bus 502 for storing information and instructions for the processor 504.

The host server 400 may be coupled via the bus 502 to a display 512, such as a cathode ray tube (CRT) or liquid crystal display (LCD), for displaying information to a user. An input device 514, including, for example, alphanumeric and other keys, voice systems, screen touch systems, and other input systems may be coupled to the bus 502 for communicating information and command selections to the processor 504. Another type of user input device may be a cursor control 516, such as a mouse, a trackball, or cursor direction keys for communicating direction information and command selections to the processor 504, and for controlling cursor movement on the display 512. The cursor control 516 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 504 and/or other components. The term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 510. Volatile media may include dynamic memory, such as main memory 506. Transmission media may include coaxial cables, copper wire and fiber optics, including wires of the bus 502. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer may read.

Various forms of the computer-readable media may be involved in carrying one or more sequences of one or more instructions to the processor 504 for execution. For example, the instructions may initially be borne on a magnetic disk of a remote computer. The remote computer may load the instructions into its dynamic memory and send the instructions over a telephone line using a modem. A modem local to the host server 400 may receive the data on the telephone line and use an infrared transmitter to convert the data to an infrared signal. An infrared detector coupled to the bus 502 may receive the data carried in the infrared signal and place the data on the bus 502. The bus 502 carries the data to the main memory 506, from which the processor 504 retrieves and executes the instructions. The instructions received by the main memory 506 may optionally be stored on the storage device 510 either before or after execution by the processor 504.

The host server 400 may also include a communication interface 518 coupled to the bus 502. The communication interface 518 typically provides a two way data communication coupling between the host server 400 and the Internet 408, other servers' storage media, and the like. For example, the communication interface 518 may be an integrated services digital network (ISDN) card or a modem used to provide a data communication connection to a corresponding type of telephone line. As another example, the communication interface 518 may be a local area network (LAN) card used to provide a data communication connection to a compatible LAN. Wireless links may also be implemented. Regardless of the specific implementation, the main function of the communication interface 518 is to send and receive electrical, electromagnetic, optical, or other signals that carry digital data streams representing various types of information.

The systems and methods herein have been described in the context of various embodiments and not every embodiment has been described. Apparent modifications and alterations to the described embodiments are available to those of ordinary skill in the art. The disclosed and undisclosed embodiments are not intended to limit or restrict the scope or applicability of the concepts of the Applicants, but rather, in conformity with the patent laws, Applicants intend to protect all such modifications and improvements to the full extent that such falls within the scope or range of equivalent of the following claims.

The various methods and embodiments of the disclosure may be included in combination with each other to produce variations of the disclosed methods and embodiments, as would be understood by those with ordinary skill in the art, given the understanding provided herein. Also, various aspects of the embodiments may be used in conjunction with each other to accomplish the understood goals of the disclosure. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. Discussion of singular elements may include plural elements and vice-versa. References to at least one item followed by a reference to the item may include one or more items. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and may further include, without limitation, integrally forming one functional member with another III a unity fashion. The coupling may occur in any direction, including rotationally.

The order of steps may occur in a variety of sequences unless otherwise specifically limited. The various steps described herein may be combined with other steps, interlineated with the stated steps, and/or split into multiple steps. Additionally, the headings herein are for the convenience of the reader and are not intended to limit the scope of the disclosure. Other and further embodiments utilizing one or more aspects of the concepts described above may be devised without departing from the spirit of Applicants' disclosure. For example, other means of using phonetics to convert the free text expressions may be used. Other variations are contemplated given the teachings of the disclosure herein.

Further, any references mentioned in the application for this patent, as well as all references listed in the information disclosure originally filed with the application, are hereby incorporated by reference in their entirety to the extent such may be deemed essential to support the enabling of the disclosure. However, to the extent statements might be considered inconsistent with the patenting of the concepts, such statements are expressly not meant to be considered as made by the Applicant(s).

What is claimed is:

1. A method, comprising:
    allowing an input of an expression associated with a desired identity;
    electronically converting the expression to a phonetic equivalent code;
    comparing the phonetic equivalent code to a plurality of phonetic equivalent codes of a known identity to determine correlations;
    correlating the expression with the known identity based on the phonetic equivalent code associated with at least one of a plurality of expressions of the known identity having a threshold correlation to the phonetic equivalent code associated with the expression of the desired identity;
    electronically providing the known identity;
    allowing an input of a verification that the electronically provided known identity matches the desired identity; and
    eliminating from a database another of the plurality of expressions of the known identity having a threshold correlation to the phonetic equivalent code associated with the expression of the desired identity.

2. The method of claim 1, wherein the method includes comparing the code to the plurality of codes with multiple passes of incrementally changing correlation criteria.

3. The method of claim 2, wherein the method includes comparing the code to the plurality of codes until a threshold correlation is at least reached in the comparison between the codes.

4. The method of claim 1, wherein the method includes:
obtaining a plurality of known identities; and
converting the known identities to a plurality of phonetic equivalent codes.

5. The method of claim 1, wherein the method includes allowing a user to enter the expression in a free text data field.

6. The method of claim 1, wherein the method includes allowing a user to enter the expression via a voice system.

7. The method of claim 4, wherein converting the known identities to the plurality of phonetic equivalent codes includes using frequency-weighted, lossy equivalent letter characterizations.

8. A non-transitory computer-readable medium having instructions stored thereon, the instructions executable by a processor to:
electronically convert an expression of an identity to a phonetic equivalent code;
compare the phonetic equivalent code to a plurality of phonetic equivalent codes associated with a plurality of known identities to determine correlations between the phonetic equivalent code and the plurality of phonetic equivalent codes;
correlate the expression with a selected identity based on the phonetic equivalent code for the expression having a threshold correlation to a phonetic equivalent code associated with an expression of the selected identity; and
eliminate from a database another expression of the selected identity having a threshold correlation to the phonetic equivalent code associated with the expression.

9. The non-transitory computer-readable medium of claim 8, wherein the instructions include instructions executable to reduce a quantity of the expressions of the identity based on the threshold correlation.

10. The non-transitory computer-readable medium of claim 8, wherein the instructions include instructions executable to compare the phonetic equivalent codes with multiple passes of incrementally changing criteria.

11. The non-transitory computer-readable medium of claim 8, wherein the instructions include instructions executable to use lossy equivalent letter characterizations.

12. The non-transitory computer-readable medium of claim 8, wherein the instructions include instructions executable to use frequency-weighted, lossy equivalent letter characterizations.

13. The non-transitory computer-readable medium of claim 8, wherein the instructions include instructions executable to search for phonetic equivalent codes in the order of the characterizations to priority search for most frequently used letters by characterizations.

14. The non-transitory computer-readable medium of claim 8, wherein the instructions include instructions executable to associate a portion of the expression with a predetermined equivalent.

15. A system, comprising:
a processor; and
a memory configured to store instructions executable by the processor to:
establish a plurality of letter characterizations for an alphabet having a plurality of letters;
assign a character to represent each of the letter characterizations;
assign a plurality of the alphabet letters to the letter characterizations, each letter characterization having at least one letter;
electronically convert an expression of an identity input by a user to a phonetic equivalent code using the characters of the letter characterizations;
provide the phonetic equivalent code to the user;
correlate the expression with a selected identity based on the phonetic equivalent code for the expression having a threshold correlation to at least one of a plurality of phonetic equivalent codes associated with at least one of a plurality of expressions of the selected identity; and
eliminating from a database another of the plurality of expressions of the selected identity having a threshold correlation to the phonetic equivalent code associated with the expression.

16. The system of claim 15, wherein the instructions include instructions executable to establish an order of the letter characterizations using frequency of usage of a letter selected from each characterization.

17. The system of claim 16, wherein the instructions include instructions executable to prioritize the letter characterizations in order by selecting a most frequently used letter in each characterization and comparing a frequency of usage of the most frequently used letter in each characterization.

18. The system of claim 15, wherein the instructions include instructions executable to use lossy equivalent letter characterizations.

19. The system of claim 15, wherein the instructions include instructions executable to use frequency-weighted, lossy equivalent letter characterizations.

20. The system of claim 15, wherein the instructions include instructions executable to:
establish a set of categories of lossy equivalent letter characterizations;
assign a character to each of the letter characterizations; and
prioritize the letter characterizations in order by selecting a most frequently used letter in each characterization and comparing a frequency of usage of the most frequently used letter in each characterization to establish the order of characterizations.

* * * * *